United States Patent
Langhammer et al.

(10) Patent No.: US 8,484,275 B1
(45) Date of Patent: Jul. 9, 2013

(54) REORDERING DISCRETE FOURIER TRANSFORM OUTPUTS

(75) Inventors: Martin Langhammer, Alderbury (GB); Neil Kenneth Thorne, London (GB)

(73) Assignee: Altera Corporation, San Jose, CA (US)

(*) Notice: Subject to any disclaimer, the term of this patent is extended or adjusted under 35 U.S.C. 154(b) by 1379 days.

(21) Appl. No.: 11/952,717

(22) Filed: Dec. 7, 2007

(51) Int. Cl.
*G06F 15/00* (2006.01)

(52) U.S. Cl.
USPC ........... 708/403; 708/400; 708/404; 708/405; 708/520

(58) Field of Classification Search
None
See application file for complete search history.

(56) References Cited

U.S. PATENT DOCUMENTS 4,156,920 A * 5/1979 Winograd .................. 708/405

* cited by examiner

*Primary Examiner* — Michael D Yaary
(74) *Attorney, Agent, or Firm* — Ropes & Gray LLP; Jeffrey H. Ingerman

(57) ABSTRACT

There is provided a method for generating a table for reordering the output of a Fourier transform, the Fourier transform being performed on a predefined number of input samples, the method comprising performing one or more decomposition stages on a sequence corresponding in number to the predefined number of input samples to form a representation of the output of the Fourier transform; wherein at least one of the decomposition stages comprises a composite operation that is equivalent to two or more operations; and rearranging the representation of the output of the Fourier transform to generate a reordering table.

22 Claims, 5 Drawing Sheets

(a)

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|----|----|----|----|----|----|----|----|----|----|----|----|----|----|----|----|----|----|----|----|
| 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 |

(b)

| 0 | 5 | 10 | 15 | 20 | 25 | 30 | 35 | 40 | 45 | 50 | 55 |
|---|---|----|----|----|----|----|----|----|----|----|----|
| 1 | 6 | 11 | 16 | 21 | 26 | 31 | 36 | 41 | 46 | 51 | 56 |
| 2 | 7 | 12 | 17 | 22 | 27 | 32 | 37 | 42 | 47 | 52 | 57 |
| 3 | 8 | 13 | 18 | 23 | 28 | 33 | 38 | 43 | 48 | 53 | 58 |
| 4 | 9 | 14 | 19 | 24 | 29 | 34 | 39 | 44 | 49 | 54 | 59 |

(c)

| 0  | 20 | 40 | 1  | 21 | 41 | 2  | 22 | 42 | 3  | 23 | 43 | 4  | 24 | 44 |
| 5  | 25 | 45 | 6  | 26 | 46 | 7  | 27 | 47 | 8  | 28 | 48 | 9  | 29 | 49 |
| 10 | 30 | 50 | 11 | 31 | 51 | 12 | 32 | 52 | 13 | 33 | 53 | 14 | 34 | 54 |
| 15 | 35 | 55 | 16 | 36 | 56 | 17 | 37 | 57 | 18 | 38 | 58 | 19 | 39 | 59 |

(d)

| 0  | 5  | 10 | 15 | 1  | 6  | 11 | 16 | 2  | 7  | 12 | 17 | 3  | 8  | 13 | 18 | 4  | 9  | 14 | 19 |
| 20 | 25 | 30 | 35 | 21 | 26 | 31 | 36 | 22 | 27 | 32 | 37 | 23 | 28 | 33 | 38 | 24 | 29 | 34 | 39 |
| 40 | 45 | 50 | 55 | 41 | 46 | 51 | 56 | 42 | 47 | 52 | 57 | 43 | 48 | 53 | 58 | 44 | 49 | 54 | 59 |

| index | seq. | index | seq. | index | seq. | index | seq. | index | seq. | index | seq. | index | seq. |
|---|---|---|---|---|---|---|---|---|---|---|---|---|---|
| 0 | 0 | 9 | 15 | 18 | 11 | 27 | 7 | 36 | 3 | 45 | 18 | 54 | 14 |
| 1 | 20 | 10 | 35 | 19 | 31 | 28 | 27 | 37 | 23 | 46 | 38 | 55 | 34 |
| 2 | 40 | 11 | 55 | 20 | 51 | 29 | 47 | 38 | 43 | 47 | 58 | 56 | 54 |
| 3 | 5 | 12 | 1 | 21 | 16 | 30 | 12 | 39 | 8 | 48 | 4 | 57 | 19 |
| 4 | 25 | 13 | 21 | 22 | 36 | 31 | 32 | 40 | 28 | 49 | 24 | 58 | 39 |
| 5 | 45 | 14 | 41 | 23 | 56 | 32 | 52 | 41 | 48 | 50 | 44 | 59 | 59 |
| 6 | 10 | 15 | 6 | 24 | 2 | 33 | 17 | 42 | 13 | 51 | 9 | | |
| 7 | 30 | 16 | 26 | 25 | 22 | 34 | 37 | 43 | 33 | 52 | 29 | | |
| 8 | 50 | 17 | 46 | 26 | 42 | 35 | 57 | 44 | 53 | 53 | 49 | | |

(f)

| seq. | addr. | seq. | addr. | seq. | addr. | seq. | addr. | seq. | addr. | seq. | addr. | seq. | addr. |
|---|---|---|---|---|---|---|---|---|---|---|---|---|---|
| 0 | 0 | 9 | 51 | 18 | 45 | 27 | 28 | 36 | 22 | 45 | 5 | 54 | 56 |
| 1 | 12 | 10 | 6 | 19 | 57 | 28 | 40 | 37 | 34 | 46 | 17 | 55 | 11 |
| 2 | 24 | 11 | 18 | 20 | 1 | 29 | 52 | 38 | 46 | 47 | 29 | 56 | 23 |
| 3 | 36 | 12 | 30 | 21 | 13 | 30 | 7 | 39 | 58 | 48 | 41 | 57 | 35 |
| 4 | 48 | 13 | 42 | 22 | 25 | 31 | 19 | 40 | 2 | 49 | 53 | 58 | 47 |
| 5 | 3 | 14 | 54 | 23 | 37 | 32 | 31 | 41 | 14 | 50 | 8 | 59 | 59 |
| 6 | 15 | 15 | 9 | 24 | 49 | 33 | 43 | 42 | 26 | 51 | 20 | | |
| 7 | 27 | 16 | 21 | 25 | 4 | 34 | 55 | 43 | 38 | 52 | 32 | | |
| 8 | 39 | 17 | 33 | 26 | 16 | 35 | 10 | 44 | 50 | 53 | 44 | | |

REORDERING DISCRETE FOURIER TRANSFORM OUTPUTS

TECHNICAL FIELD OF THE INVENTION

The invention relates to a method and apparatus for generating a table for reordering the output of a Discrete Fourier Transform (DFT) or inverse Discrete Fourier Transform processor.

BACKGROUND TO THE INVENTION

When processing signals in wireless communication networks, such as a 3G Long Term Evolution (LTE) network (one of which is known as Evolved Universal Terrestrial Radio Access—E-UTRA, developed by the $3^{rd}$ Generation Partnership Project—3GPP), it is often necessary to carry out a Discrete Fourier Transform (DFT) on an input signal. The DFT is used to transform the input signal from the time domain to the frequency domain. An inverse-DFT is used to transform an input signal from the frequency domain to the time domain.

A Discrete Fourier Transform engine in a Field Programmable Gate Array (FPGA) receives m-length complex samples at its input and transforms them to m-length complex samples at its output. The input samples are assumed to be in a normal order, so, for a time-to-frequency transformation, the first time sample will be $t_0$, the second sample will be $t_1$, the third sample will be $t_2$, and so on. To be useful, the output samples (denoted $bin_0$, $bin_1$, ...) should also be in a normal order, so $bin_0$ first, $bin_1$ second, $bin_2$ third and so on.

However, in performing the DFT efficiently, the DFT engine operates on the input samples in order, but the output samples are mixed up and disordered. The same applies when an inverse-DFT is performed on an ordered set of input samples.

Thus, the output samples must be reordered before they can be used by subsequent components. There is therefore a need for an algorithm that can reorder the output samples.

SUMMARY OF THE INVENTION

According to a first aspect of the invention, there is provided a method for generating a table for reordering the output of a Fourier transform, the Fourier transform being performed on a predefined number of input samples, the method comprising performing one or more decomposition stages on a sequence corresponding in number to the predefined number of input samples to form a representation of the output of the Fourier transform; wherein at least one of the decomposition stages comprises a composite operation that is equivalent to two or more operations; and rearranging the representation of the output of the Fourier transform to generate a reordering table.

According to a second aspect of the invention, there is provided a circuit for generating a table for reordering the output of a Fourier transform, the Fourier transform being performed on a predefined number of input samples, the circuit comprising control logic for performing one or more decomposition stages on a sequence corresponding in number to the predefined number of input samples to form a representation of the output of the Fourier transform; wherein the control logic combines two or more operations into at least one of the decomposition stages; and rearranging the representation of the output of the Fourier transform to generate a reordering table.

According to a third aspect of the invention, there is provided a method of improving a method for generating a table for reordering the output of a Fourier transform, the Fourier transform being performed on a predefined number of input samples, the method for generating a table comprising performing two or more decomposition stages on a sequence corresponding in number to the predefined number of input samples to form a representation of the output of the Fourier transform, each decomposition stage comprising an operation; and rearranging the representation of the output of the Fourier transform to generate a reordering table; wherein the method of improving comprises the step of combining two or more decomposition stages into a single stage, such that the single stage comprises a composite operation that is equivalent to the operations in the two or more decomposition stages.

BRIEF DESCRIPTION OF THE DRAWINGS

The invention will now be described, by way of example only, with reference to the following drawings, in which:

FIGS. 3(*a*) to (*f*) illustrate the reordering of a DFT output in accordance with the invention.

DETAILED DESCRIPTION OF THE PREFERRED EMBODIMENTS

The invention will now be described with reference to reordering a set of output samples generated by performing a Discrete Fourier Transform on an ordered set of input samples $t_0, t_1, \ldots, t_{m-1}$. However, it will be appreciated by a person skilled in the art that the invention is equally applicable to reordering a set of output samples generated by performing an inverse-Discrete Fourier Transform on an ordered set of input samples.

Figure 1:
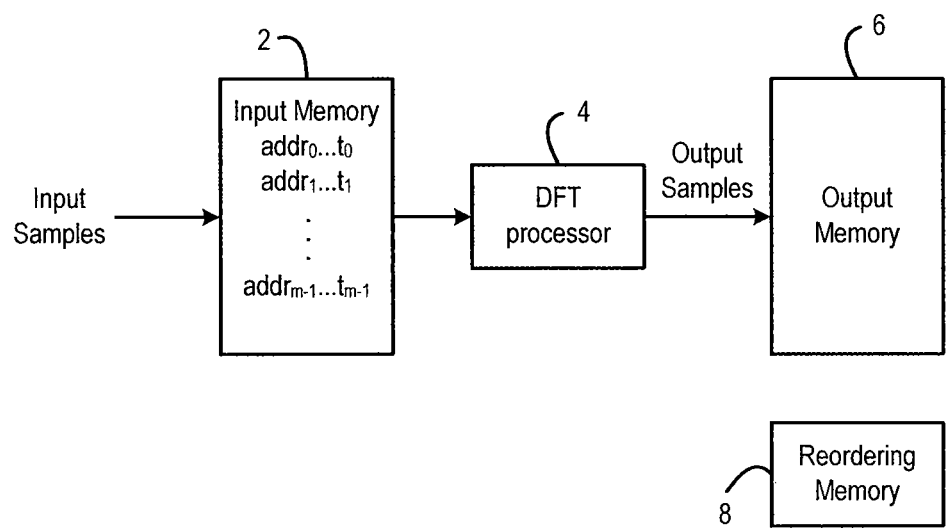
FIG. 1 is a block diagram of a system that includes a Discrete Fourier Transform processor.

FIG. 1 shows an input memory 2, such as a RAM, into which an m-length ordered set of input samples ($t_0, t_1, \ldots, t_{m-1}$) are read. In the following, it is assumed that the set of input samples are read into the input memory 2 in the correct order, so that the ordered samples match the memory address order (so $t_0$ is stored in address $addr_0$, $t_1$ is stored in address $addr_1$, ..., $t_{m-1}$ is stored in address $addr_{m-1}$).

A Discrete Fourier Transform processor 4 reads the input samples from the input memory 2 in order and performs a DFT to produce a set of output samples $bin_0, bin_1, \ldots, bin_{m-1}$ (which is an ordered set) and are stored in an output memory 6 (which may be a separate memory block to the input memory 2, or part of the same memory block). However, as the output samples are mixed up, they will be stored in the output memory 6 so that output sample $bin_x$ is stored in address location $addr_0$, output sample $bin_y$ is stored in address location $addr_1$ and output sample $bin_z$ is stored in address location $addr_{m-1}$. Therefore, as the output samples are not in the required order, they cannot be read out of the output memory 6 in address order, or another order that is sufficiently simple for a subsequent processing unit to deal with.

Therefore, the invention provides an algorithm for determining the order that the output samples should be read in order to recover the ordered set of output samples. A third memory 8, referred to as a reordering memory, is provided that stores a reordering table that indicates the order in which the output samples should be read from the output memory 6 to obtain the correct sequence.

The algorithm according to the invention will now be described with reference to an input set of samples that comprises 60 samples (i.e. the length m equals 60), that are stored in order in the input memory 2. However, it will be appreciated that the invention can be applied to any value of m, provided that m can be factorised. A memory location $addr_x$ in the input memory 2 stores an input sample $t_x$, with the input sample comprising a complex pair of data samples.

Although the example described here uses a value of 60 for m, it will be appreciated that in an LTE implementation, m can take any value that can be represented as a product of the numbers 2, 3, 4 and 5, i.e. $m = 2^i \times 3^j \times 4^k \times 5^l$, where i, j, k and l are integers. In an LTE implementation, there are currently 35 possible values for m, ranging from 12 to 1296.

An m-point transform is decomposed into several stages. Each stage is a prime number or a factor of 2. In the present example, the 60-point transform can be decomposed such that $m = 2^0 \times 3^1 \times 4^1 \times 5^1$. Therefore, in an LTE implementation, there can be between 2 and 6 stages, as the value of m can range from 12 to 1296.

Any power of 2 used is broken down into as many stages of the largest power of 2 supported (for example, this is typically 4, but it could be 8, 16, 32, etc.) followed by the next largest power of 2. So, length 32 would be broken down into three stages of 4, 4 and 2 in that order if 4 is the maximum power of 2 supported. The stages are assumed to be the same size or decreasing in size.

Each stage or pass is referred to as a "Radix n" operation, where n is the Radix of the stage being considered. For a 3G LTE application, the invention supports Radices 2, 3, 4 and 5, although for different implementations, other radix values are possible.

Thus, in the 60-point example, the length can be decomposed into three stages of 5, 4 and 3 in that order (since 3×4×5=60).

Figure 2:
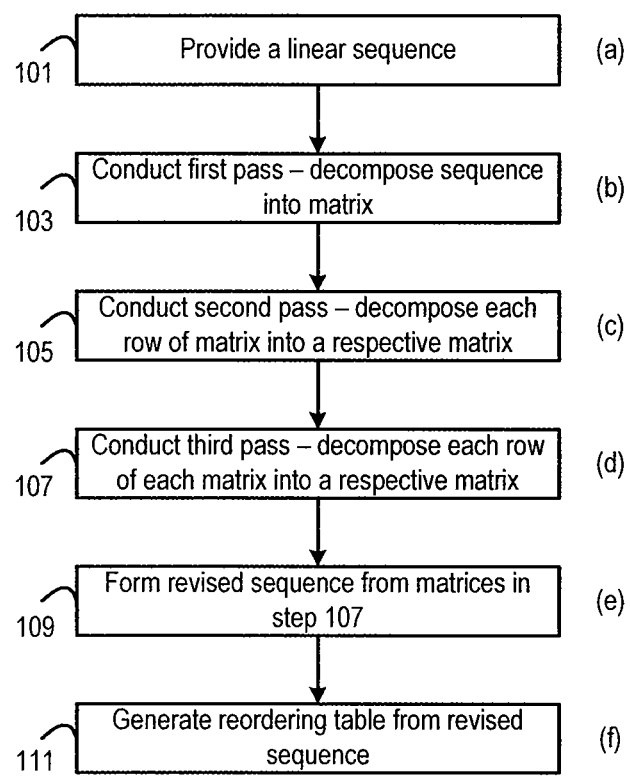
FIG. 2 is a flow chart illustrating the reordering of a DFT output in accordance with the invention.

FIGS. 2 and 3 illustrate the procedure underlying the method in accordance with the invention.

In step 101 of FIG. 2 and FIG. 3(a), a linear sequence is provided. The sequence comprises 60 elements labelled 0 to 59 and represents the desired order of the output samples. To aid the understanding of the following steps, the linear sequence can be thought of as a 1×60 matrix (i.e. one row, 60 columns).

In step 103, a first pass is conducted on the elements in the linear sequence. From the above, the first radix is 5, so the elements of the sequence are decomposed into a matrix having 5 rows (the number of rows corresponding to the radix value). Thus, the matrix will be a 5×12 matrix (i.e. 5 rows, 12 columns), with the elements in the sequence shown in FIG. 3(a) being decomposed such that, starting from element 0 in row 1, column 1 (matrix location (1, 1)), the columns are filled in turn by sequential element values (so column 1 contains elements 0, 1, 2, 3 and 4, column 2 contains elements 5, 6, 7, 8 and 9, and so on).

In step 105, a second pass is conducted on the matrix generated in step 103. The second pass uses the second radix value of 4, and decomposes each row of elements in the matrix shown in FIG. 3(b) into a respective matrix having a number of rows equal to the second radix value, 4. As each row of the matrix in FIG. 3(b) contains twelve elements, the matrices formed by step 105 will be 4×3 matrices. Thus, each row of the matrix in FIG. 3(b) will be decomposed into a respective 4×3 matrix.

The rows of the matrix in FIG. 3(b) are decomposed into the 4×3 matrix in the same way that the linear sequence in FIG. 3(a) was decomposed into the matrix shown in FIG. 3(b). Therefore, starting from the first element in a row of the matrix in FIG. 3(b), the columns of the 4×3 matrix are filled in turn by the elements from the relevant row to give the five matrices shown in FIG. 3(c).

In step 107, a third pass is conducted on the matrices generated in step 105. The third pass uses the third radix value of 3, and decomposes each row of elements in each of the matrices shown in FIG. 3(c) into a respective matrix having a number of rows equal to the third radix value, 3. As each row of the matrices in FIG. 3(c) contain three elements, the matrices formed by step 107 will be 3×1 matrices.

Again, this decomposition is carried out in the same way as in steps 103 and 105.

In step 109, a revised sequence is formed from the elements in the matrices in FIG. 3(d) by reading out all of the elements in each of the matrices in turn. Thus, the revised sequence comprises the elements from the first matrix (i.e. 0, 20, 40), followed by the elements from the second matrix (i.e. 5, 25, 45), and so on. In addition, an index value is assigned to each of the elements in the revised sequence. Thus, the elements in the first 3×1 matrix in FIG. 3(d) are assigned index values 0, 1 and 2 respectively; the elements in the second 3×1 matrix are assigned index values 3, 4 and 5 respectively, and so on.

The assigned index values represent the order in which samples are output from the DFT processor 4. Thus, index value 0 corresponds to the first sample output from the DFT processor 4, index value 1 the second sample output, and so on, with each index value corresponding to an address in the output memory 6.

The value of each element in the revised sequence indicates the position of that element in the desired (reordered) sequence of output samples. Thus, the elements with values 0, 1, 2, 3 correspond to the first four output samples respectively that should be read from the output memory 6.

In step 111, a reordering table is generated from the revised sequence and corresponding indices in FIG. 3(e). In particular, as it is assumed that the samples output from the DFT processor 4 are stored in the output memory 6 in the order in which they are output from the processor 4, the reordering table will indicate the order in which the addresses in the output memory 6 should be read in order to recover the correct sequence of output samples.

The reordering table is generated by putting the revised sequence into numerical order, with the index associated with each element indicating the respective address in the output memory 6 that should be accessed. Thus, from FIG. 3(f), to obtain the correct sequence of output samples, the first four output samples ($bin_0$, $bin_1$, $bin_2$ and $bin_3$) should be read from the $0^{th}$, $12^{th}$, $24^{th}$ and $36^{th}$ addresses in the output memory 6.

As described above, the DFT processor 4 performs the discrete Fourier transform through several passes of the data, with the number of passes being equal to the number of "Radix n" stages mentioned above.

In one particular implementation of a DFT processor 4, each pass takes m clock cycles, where m is the number of points in the transform. In order to avoid introducing latency into the system, it is preferable for the reordering table to be available to subsequent stages or components by the time that the DFT processor 4 completes the final pass of the input data. In this way, the correct sequence of output samples can be obtained immediately after the DFT processor 4 completes the transform of the input samples.

Of course, it will be appreciated that it is possible to pre-generate the reordering tables for all of the different values of m, but in most instances, the number of possible values of m will mean that a large memory will be required to store all of the pre-generated tables.

Therefore, in accordance with an embodiment of the invention, the appropriate reordering table is generated 'on-the-fly' by the processor. In particular, the generation of the reordering table is split into 'P' passes, each one taking 'm' clock cycles and taking place in parallel with the 'p' passes performed by the DFT processor 4.

In the following, the invention will be described with reference to the 60-point transform example above in which the DFT processor 4 performs three passes (i.e. P=p=3), but, again, it will be appreciated that the invention is applicable to any m-length transform where the number of passes is equal to or greater than 2.

In FIG. 2, it can be seen that there are three decomposition stages (steps 103, 105 and 107), each comprising a single radix-n operation, corresponding to the three passes by the DFT processor 4, and a stage of generating the reordering table from the result of the decomposition stages (step 111).

The first step (step 101) is quite trivial (i.e. providing a linear sequence having m elements) and can effectively be combined with the first decomposition in step 103 to form a single step.

As described above, each of the decomposition stages requires m clock cycles (i.e. 60 clock cycles) to complete. Therefore, there are a total of four stages to be performed in the reordering process for m=60, but only three passes by the DFT processor 4 within which to complete them.

The final step, step 111, must be carried out at the same time as the last pass by the DFT processor 4 in order to satisfy the latency requirements. Thus, the three radix operations must be carried out within the time taken by the DFT processor 4 to complete two passes.

It will be appreciated that in the general case where there are 'p' passes, the 'P' radix operations need to be carried out in 'p−1' passes.

In the present example, it can be seen that the progression from the matrices derived in step 105 and shown in FIG. 3(c) to the revised sequence in step 109 and FIG. 3(e) is relatively simple. In particular, the revised sequence in FIG. 3(e) can be obtained from the matrices in FIG. 3(c) by reading out the values in each row of each matrix in turn. Therefore, it can be seen that once the matrix shown in FIG. 3(b) has been derived, the second decomposition stage can be used to carry out both the radix-4 and radix-3 operations and derive the revised sequence shown in FIG. 3(e) within the time that the DFT processor 4 takes to carry out a single pass.

Therefore, the process shown in steps 101 to 109 of FIG. 2 can be simplified to just two decomposition stages, the first is the derivation of the matrix shown in FIG. 3(b) during the first pass of the input samples by the DFT processor 4 (a combination of steps 101 and 103), and the second is the derivation of the revised sequence shown in FIG. 3(e) during the second pass of the input samples by the DFT processor 4 (a combination of steps 105, 107 and 109).

The final stage in the reordering process, the generation of the reordering table (step 111), can be carried out during the third pass of the input samples by the DFT processor 4.

In the general case where there are P decomposition stages and a table generation step to be carried out during p passes of the input samples by the DFT processor 4, the invention provides that two or more of the operations are combined into a single composite operation in a single decomposition stage. Preferably, the penultimate and final radix-n operations are combined, but the invention can equally be implemented by combining any other consecutive radix-n operations into a single stage.

Furthermore, combining more than two operations into a single composite operation in a stage means that the process for generating the reordering table can be completed before the completion of the processing by the DFT processor 4. Consequently, it is possible to improve the DFT processor so that it takes less time (i.e. clock cycles) to complete the DFT processing, thereby reducing the total time taken for the DFT process.

Figure 4:
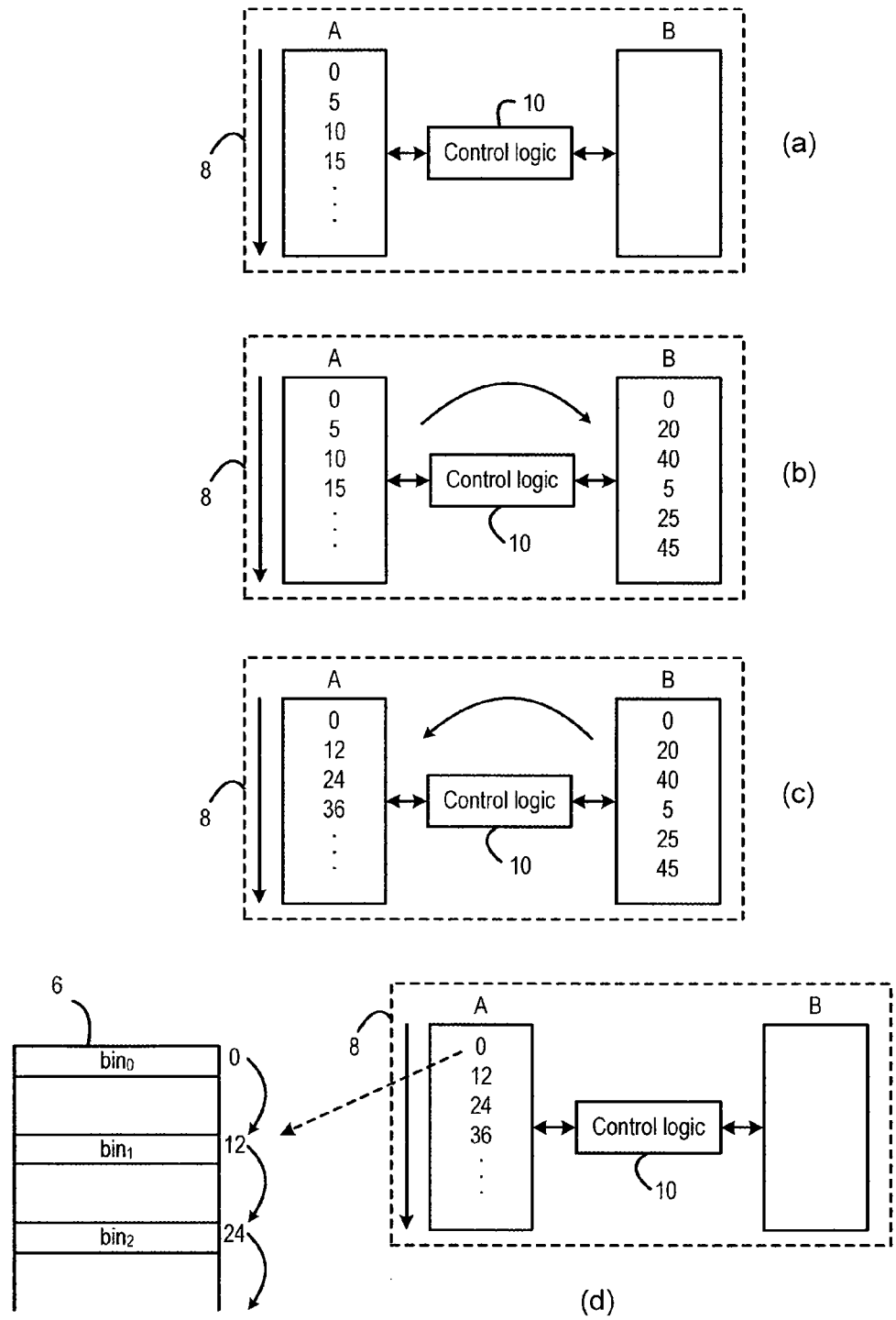
FIGS. 4(*a*) to (*d*) illustrates the operation of a reordering memory in accordance with the invention.

FIG. 4 shows how the procedure described above can be implemented in the reordering memory 8. In this embodiment, the reordering memory 8 comprises two separate memory units, unit A and unit B. Although these units are shown separately, it will be appreciated that they can be part of a single memory block. Furthermore, it is possible that the reordering memory 8 can be part of the same memory block as the output memory 6.

Each of the memory units A and B are large enough to accommodate m data entries (which is 60 in this example). Therefore, in a LTE DFT implementation, the memory units A and B must be able to store 1296 entries. The data width of each memory unit is that required to hold the address range for 'm-length' addresses (i.e. 6 bits for m=60, and 11 bits for m=1296).

In FIG. 4(a), a data sequence corresponding to the matrix shown in FIG. 3(b) is written into memory unit A. This data sequence is generated using control logic 10 that cycles through an m-element linear sequence, and takes place while the DFT processor 4 is carrying out the first pass on the input samples.

Thus, the operation of the control logic 10 will result in the sequence 0, 5, 10, 15, 20, . . . , 54, 59 being generated from a 60-element linear sequence.

As shown in FIG. 4(b), the control logic 10 reads out the sequence stored in memory unit A in the order necessary to arrive at the revised sequence of FIG. 3(e), and stores the revised sequence in memory unit B. This operation takes place while the DFT processor 4 is carrying out the second pass on the input samples.

In the general case, if further decomposition steps are required while the DFT processor 4 operates on the input samples, the data is alternately written between the two memory units.

In FIG. 4(c), during the final pass by the DFT processor 4, the control logic 10 generates the reordering table from the revised sequence stored in memory unit B, and stores this reordering table in memory unit A.

In one embodiment, the control logic 10 reads through the data in memory unit B in a linear order (i.e. starting with sequence values 0, 1, 2, 3, . . . ) and writes the corresponding address in memory unit B to memory unit A. Thus, the address in memory unit B in which sequence value 4 is located is written to the fifth memory address in memory unit A. Thus, memory unit A will be filled with linearly increasing data values (0 to 59) represented by the addresses in which they can be located in the output memory 6.

In the general case, if the initial data sequence is written to memory unit A, the reordering table will end up in memory unit A if p is odd, but it will end up in memory unit B if p is even.

FIG. 4(d) shows how the reordering table stored in memory unit A is used to obtain the correct sequence of output samples from the output memory 6.

It will be appreciated that the various increment values that are to be used during each pass (by either the DFT processor 4 or in the reordering memory 8) will be predetermined and stored in a memory. In addition, the memory will also store predetermined parameter values for "radix n" passes other than 3, 4 and 5 in order to handle various DFT lengths.

In addition, although the invention has been described with reference to a Discrete Fourier Transform or an inverse-DFT, it will be appreciated that the invention is also applicable to the reordering of output samples from a Fast Fourier Transform (FFT) or an inverse-FFT. In this case, the number of points in the transform will be represented by $2^i$, and the reordering algorithm operates in the same way as that described above. In particular, the reordering of $2^i$ point transforms comprises reversing the bits of the linear address (when represented in binary) to give the ordered sequence of addresses for the second memory 6.

There is therefore provided an apparatus and procedure for generating a reordering table for a sequence of samples output by a Discrete Fourier Transform processor.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope. A computer program may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. A method for using apparatus in a communication system to generate a table for reordering the output of a Fourier transform, the Fourier transform being performed on a predefined number of input samples, wherein the predefined number is selected to be a product of integer powers of members of a selected group of radices, the method comprising:
    arranging, using control logic of the apparatus, an initial sequence of the predefined number of input samples as an initial matrix having only one row and having columns corresponding in number to the predefined number;
    performing, in the control logic of the apparatus, decomposition stages, corresponding in number to a count of those members of the selected group of radices having nonzero powers in the product, on the initial matrix of input samples to form a representation of the output of the Fourier transform; wherein:
    each decomposition stage transforms a matrix row into a further matrix having rows corresponding in number to a respective member, having a nonzero power, of the selected group of radices; and
    rearranging, in the control logic of the apparatus, an output matrix of a final one of the decomposition stages, using the control logic, to generate a reordering table.

2. A method as claimed in claim 1, wherein the count, and the number of decomposition stages, is three.

3. A method as claimed in claim 1, wherein the Fourier transform is a Discrete Fourier Transform.

4. A method as claimed in claim 1, wherein the Fourier transform is an inverse-Discrete Fourier Transform.

5. A method as claimed in claim 1, for use in an E-UTRA communication system.

6. A method as claimed in claim 5, wherein the predefined number of input samples is in the range 12 to 1296 and the selected group of radices are 2, 3, 4 and 5, such that any selected predefined number can be represented by $2^i \times 3^j \times 4^k \times 5^l$, where i, j, k and l are non-negative integers.

7. A method as claimed in claim 2 wherein the first decomposition stage decomposes the initial matrix into a first matrix having rows corresponding in number to a largest one of the members of the selected group of radices having nonzero powers in the product.

8. A method as claimed in claim 7 wherein the second decomposition stage decomposes each row of the first matrix into a respective second matrix, each respective second matrix having rows corresponding in number to a second-to-largest one of the members of the selected group of radices having nonzero powers in the product.

9. A method as claimed in claim 8 wherein the third decomposition stage decomposes each row of each respective second matrix into a respective third matrix, each respective third matrix having rows corresponding in number to a third-to-largest one of the members of the selected group of radices having nonzero powers in the product.

10. A method as claimed in claim 1, wherein the predefined number of input samples is in the range 12 to 1296 and the selected group of radices are 2, 3, 4 and 5, such that any selected predefined number can be represented by $2^i \times 3^j \times 4^k \times 5^l$, where i, j, k and l are non-negative integers.

11. A circuit for generating a table for reordering the output of a Fourier transform, the Fourier transform being performed on a predefined number of input samples, wherein the predefined number is selected to be a product of integer powers of members of a selected group of radices, the circuit comprising:
    control logic for:
    arranging an initial sequence of the predefined number of input samples as an initial matrix having only one row and having columns corresponding in number to the predefined number;
    performing decomposition stages, corresponding in number to a count of those members of the selected group of radices having nonzero powers in the product, on the initial matrix of input samples to form a representation of the output of the Fourier transform; wherein:
    each decomposition stage transforms a matrix row into a further matrix having rows corresponding in number to a respective member, having a nonzero power, of the selected group of radices; and
    rearranging an output matrix of a final one of the decomposition stages to generate a reordering table.

12. A circuit as claimed in claim 11, wherein the count, and the number of decomposition stages, is three.

13. A circuit as claimed in claim 11, wherein the control logic comprises first and second memories, and performing a decomposition stage comprises reading the sequence from one of the memories and writing the sequence in a reordered form in the other one of the memories.

14. A circuit as claimed in claim 11, wherein the Fourier transform is a Discrete Fourier Transform.

15. A circuit as claimed in claim 11, wherein the Fourier transform is an inverse-Discrete Fourier Transform.

16. A circuit as claimed in claim 11, wherein the circuit is for an apparatus for use in a communication system.

17. A circuit as claimed in claim 16, wherein the communication system is an E-UTRA communication system.

18. A circuit as claimed in claim 15, wherein the predefined number of input samples is in the range 12 to 1296 and the selected group of radices are 2, 3, 4 and 5, such that any selected predefined number can be represented by $2^i \times 3^j \times 4^k \times 5^l$, where i, j, k and l are integers.

19. A circuit as claimed in claim 12 wherein the first decomposition stage decomposes the initial matrix into a first matrix having rows corresponding in number to a largest one of the members of the selected group of radices having nonzero powers in the product.

20. A circuit as claimed in claim 19 wherein the second decomposition stage decomposes each row of the first matrix into a respective second matrix, each respective second matrix having rows corresponding in number to a second-to-largest one of the members of the selected group of radices having nonzero powers in the product.

21. A circuit as claimed in claim 20 wherein the third decomposition stage decomposes each row of each respective second matrix into a respective third matrix, each respective third matrix having rows corresponding in number to a third-to-largest one of the members of the selected group of radices having nonzero powers in the product.

22. A circuit as claimed in claim 11, wherein the predefined number of input samples is in the range 12 to 1296 and the selected group of radices are 2, 3, 4 and 5, such that any selected predefined number can be represented by $2^i \times 3^j \times 4^k \times 5^l$, where i, j, k and l are non-negative integers.

\* \* \* \* \*